Oct. 1, 1968　　　A. A. DREISZIGER　　　3,403,965
GAS-FIRED INFRARED BURNER

Filed May 25, 1966　　　2 Sheets-Sheet 1

INVENTOR.
ADAM A. DREISZIGER
BY Bosworth, Sessions,
Herrstrom & Knowles

ATTORNEYS

United States Patent Office 3,403,965
Patented Oct. 1, 1968

3,403,965
GAS-FIRED INFRARED BURNER
Adam A. Dreisziger, Lakewood, Ohio, assignor to Bettcher Manufacturing Corporation, Cleveland, Ohio
Filed May 25, 1966, Ser. No. 552,922
4 Claims. (Cl. 431—347)

ABSTRACT OF THE DISCLOSURE

A gas-fired infrared generator is provided for use in connection with space heating installations. The generator is adapted for use without need for ventilating equipment to exhaust the products of combustion. Greater heating efficiency is afforded by utilizing a wedge-shaped internal deflector which is heated to incandescence and which directs the gaseous products of combustion laterally outwardly through a perforate incandescent mantle.

---

The present invention relates to infrared space heating and more particularly to infrared radiant heaters of metallic construction utilizing the combustion of fuel gas as their source of thermal energy.

The use of radiant energy for space heating affords many unique advantages and is particularly useful for many applications where other more conventional heating methods are not suitable. Large industrial work areas having high ceilings are a particular example as are work areas where the presence of dust and other deleterious materials makes the use of forced air systems impractical.

The thermal energy geneartaed by these radiant heating systems is in the form of infrared radiation emitted by a high temperature element which is generally formed of metal or a ceramic material and which is heated to a suitable temperature by an internal heat generator such as electrical heating elements or a fuel gas burner. The present invention relates only to those types of infrared heaters which utilize a fuel gas burner to generate the required heat.

A particular problem inherent in the use of fuel gas to generate energy for heating enclosed spaces is the production of gaseous combustion products some of which under certain conditions may be toxic and endanger persons in the enclosed heated space if they are not eliminated. In the case of incomplete combustion caused by an insufficient supply of oxygen in the combustion chamber, carbon monoxide and unburned fuel gas are particular examples and where they are produced in significant concentrations, precautions must be taken to insure that all the gaseous combustion products are forced out of the enclosed space. This ventilation results in the escape of a substantial portion of the available heat energy and also necessitates the installation of expensive fans and ventilating equipment.

Even where a more complete combustion is achieved, toxic concentrations of carbon monoxide can be produced if the flames in the combustion chamber impinge directly on the metallic surfaces such as those of the radiant elements to be heated to incandescence. Since most conventional metallic heater designs require a direct flame impingement upon radiant elements in order to achieve sufficient heat transfer to raise the temperature of the elements to the point of incandescence, the existence of toxic concentrations of carbon monoxide is not uncommon.

Another dangerous gaseous combustion product that is produced whenever a direct flame impingement exists is nitrogen dioxide, a gas which is highly toxic even in extremely small concentrations. It has been found, however, that this gas is not normally produced unless there is a direct flame impingement in the combustion chamber.

In order to avoid the production of the toxic gases mentioned above, attempts have been made to design infrared heaters wherein a direct flame impingement is avoided. However, these designs are usually plagued by an undesirable loss of radiant efficiency. This is generally due to the cooling of the gases and of the flames before proper heat transfer can be made to the radiant element which results in most cases from the use of secondary air introduced directly into the combustion chamber to achieve complete combustion. Secondary air will be defined for present purposes as air supplemental to that air in the fuel-air combustion mixture which is introduced into the combustion chamber when the fuel-air mixture is below a combining ratio in order to achieve a more complete combustion. Due to the difficulty in mixing secondary air in which the gaseous fuel-air mixture, an amount of air which exceeds the combining ratio is usually required. This results in a cooling of the flames and in some cases a premature extinguishing of the flames before they have reached an optimum combustion condition. Accordingly, the use of secondary air is generally undesirable where an optimum radiant efficiency is desired.

Another factor which reduces radiant efficiency in instances wherein a direct flame impingement is avoided is the thermal loss due to convection and conduction which prevent a sufficient portion of the thermal energy from being transferred from the radiant element.

Accordingly it is desirable to minimize ventilation and dilution of the gaseous products of combustion in order to utilize the thermal energy therein in the heating of the radiant element. It is also desirable to avoid the use of secondary air by introducing a fuel-air mixture into the combustion chamber which is as close to a combining ratio as possible, the fuel and air being sufficiently mixed to achieve complete combustion so that no unburned fuel gas remains. The flame layer in the combustion chamber should be spaced sufficiently from the radiant elements and other metal parts being heated so that the flames do not impinge directly upon any metallic parts. Additionally the heater should be so designed and insulated that thermal losses due to convection and conduction will be kept to a minimum.

Prior gas fired heaters of all-metallic construction have been unable to accomplish these goals and have, in fact, required either the use of secondary air to achieve complete combustion or have used a flue to vent the gaseous combustion products out of the enclosed heated space. The heater construction of the present invention, however, satisfies the above objections and also provides unique and unexpected advantages heretofore not obtainable.

According to my invention there is provided an infrared generator having a mixer tube for introducing a gaseous fuel-air mixture into a plenum at an optimum combining ratio, the plenum having an upwardly facing outlet covered by a horizontal burner screen. The port area of the burner screen is so designed relative to the throat area of the venturi that a port loading is achieved which results in a flame layer spaced upwardly above the burner screen a sufficient height that there is no direct flame impingement and the screen is not heated to the point of incandescence. The flame layer is located within an enclosure the walls of which constitute incandescent elements, the walls being spaced sufficiently from the flame layer to avoid any direct flame impingement.

The incandescent element is in the form of a perforated metallic mantel which extends upwardly above the plenum. A wedge-shaped metallic deflector which is also formed formed of a high temperature material is located above the flame layer and serves to deflect the gaseous combustion products laterally through the perforations in the mantle so that the heat energy in the gases is utilized in the heating of the mantle and so that the combustion products escape from the combustion chamber into the enclosed heated space. Both the mantle and deflector are heated to incandescense by the heat generated in the combustion chamber and provide a solid incandescent front in directions normal to the mantle so that the radiation from the incandescent deflector is utilized in the heating of the surrounding space.

As an additional aspect of the invention, the mixer tube includes a double venturi arrangement including a first orifice which directs a jet of fuel gas into a venturi throat through which air is drawn into the mixer tube along with the fuel gas. This mixture is then discharged through a second orifice into a second venturi throat wherein additional air is drawn in a sufficient quantity to raise the oxygen level in the fuel-air mixture to a proper combining ratio.

This construction provides a gas-fired infra-red heater which does not incorporate means for directly venting the combustion products, which does not require secondary air to achieve complete combustion and which has a high radiant efficiency. Since there is no direct flame impingement involved in the transfer of heat energy to the radiant element which is heated to incandescence, the formation of carbon monoxide is held to a minimum, if not entirely avoided. In a specific case where a burner embodying the invention was operated at half the normal test pressure, the carbon monoxide concentration in the gaseous combustion products was only about 25 parts per million on an air-free basis.

It is among the objects of the invention to provide a new and improved gas-fired infrared space heater of metallic construction having a high radiant efficiency, and a low concentration of toxic components in the gaseous combustion products.

Another object of the invention is to provide a gas-fired infrared heater construction which eliminates any direct flame impingement upon metallic parts.

A further object of the invention is to provide an infrared space heater utilizing a fuel gas as its energy source wheren the fuel gas is mixed with sufficient air prior to introduction into the combustion chamber to provide a complete combining ratio and eliminate the need for secondary air in the combustion chamber.

Other objects, uses and advantages of the invention will become apparent upon a reading of the following detailed description and drawings which illustrate a preferred embodiment of the invention and wherein.

Referring more particularly to the drawings, there is shown a gas fired infrared space heater embodying the invention and utilizing a low pressure fuel gas as the energy source.

The heater comprises a burner housing 10 which defines a plenum 11 for a fuel-air mixture.

Figure 1:
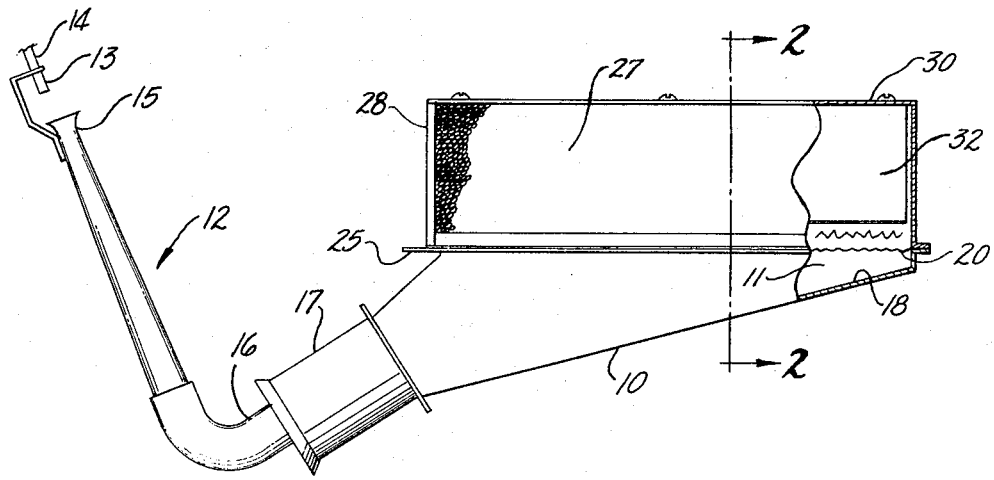
FIGURE 1 is an elevational view of an infrared space heater embodying the invention with parts broken away and shown in section.
Figure 2:
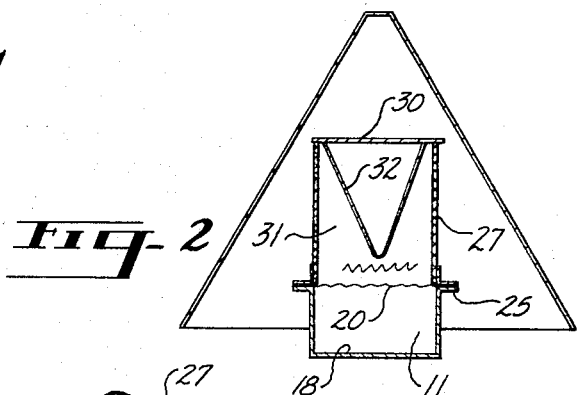
FIGURE 2 is a transverse sectional view taken on the line 2—2 of FIGURE 1.
Figure 3:
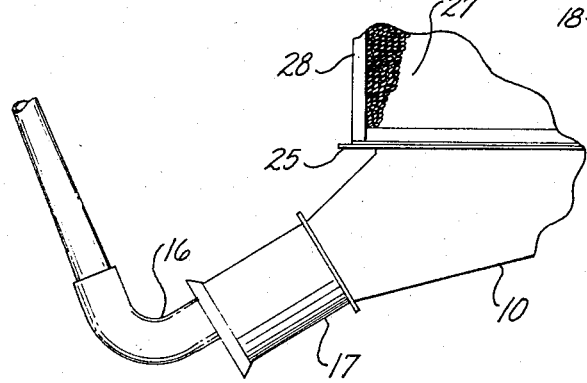
FIGURE 3 is a fragmentary side elevational view showing a modified form of the invention.
Figure 4:
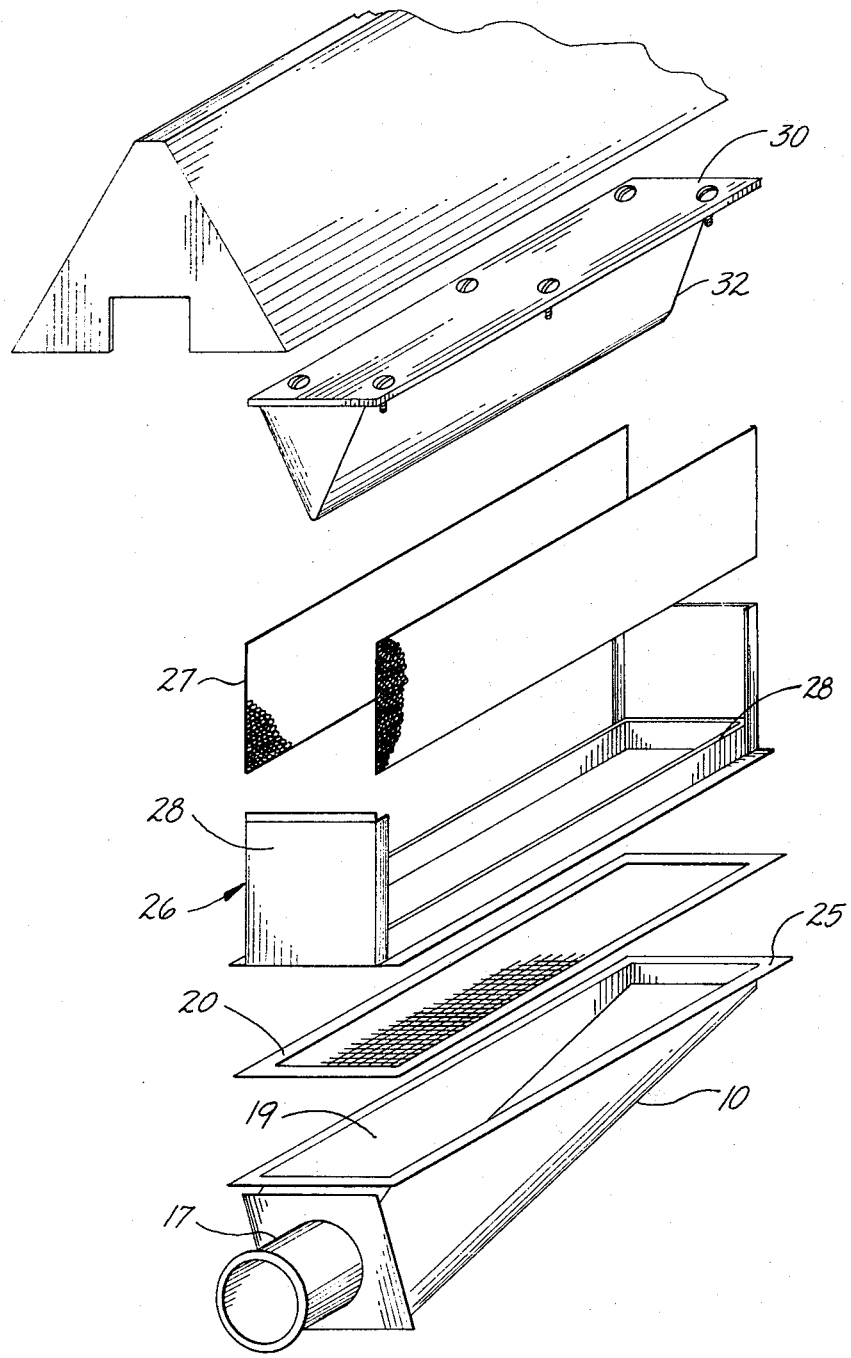
FIGURE 4 is an exploded perspective view of the heater of FIGURE 1.

The fuel-air mixture is introduced into the plenum in a combining ratio by means of a mixer tube assembly 12. The mixer tube assembly includes a double venturi arrangement including an orifice fitting 13 communicating with the fuel gas supply line 14. The orifice fitting 13 directs a jet of fuel gas axially through a venturi throat 15 at the end of the mixer tube assembly 12 and thus aspirates into the mixer tube assembly a volume of air which mixes with the fuel gas. The resulting mixture is directed through an orifice 16 at the opposite end of the mixer tube assembly 12 to a second venturi throat 17 in the form of a tubular sleeve formed at the end of the burner housing 10. Additional air is drawn into the venturi throat 17 to provide a fuel air mixture introduced into the plenum at an optimum combining ratio. FIGURE 3 shows a modified form of mixer tube assembly wherein the orifice 16 is located off-center relative to the second venturi throat 17. This arrangement has been found to afford an unexpected improvement in mixing of the gases and in ignition.

The housing 10 is of generally rectangular form and has a sloping floor 18 adapted to deflect the fuel-air mixture from the second venturi throat 17 upwardly through a rectangular opening 19. The opening 19 at the top of the burner housing 10 is covered by a burner screen 20 which is preferably formed of woven metal wire having a mesh size which provides screen ports to achieve the desired port loading. In the case of the present design, it has been found that a port loading of about 2350–4350 B.t.u.h./in.$^2$ is preferred to provide the proper entrainment characteristics. A screen with ports having an area about .0019 to .0031 in.$^2$ is particualrly suitable. This serves to quench the flame and eliminate flash back and also provides an open area from 50–60% of the total area to provide proper aeration. A preferred material for the screen is .015–.018″ nickel chromium alloy wire which provides the desired strength and oxidation resistance. In any event, the ratio of the mixer tube area to burner screen port area is such that the flame layer resulting from ignition of the fuel-air mixture above the burner screen never comes into sufficiently intimate contact with the screen to raise its temperature to a critical or incandescent level.

Bolted to a perimetric flange 25 on the housing 10 is a mantle retainer assembly 26, which supports the radiant mantle 27 adapted to be heated to incandescence by the combustion of the fuel-air mixture above the burner screen 20. The mantle retainer assembly 26 has low side walls 28 on two sides thereof which are spaced sufficiently from the flame layer to avoid any direct flame impingement. The two end walls 28 of the mantle retainer assembly 26 exetnd upwardly the full height of the radiant mantle 27 and have inwardly bent side flanges which serve to retain the ends of the mantle.

The mantle 27 is perforated throughout its surface area and is formed of a material adapted to operating conditions at the temperature provided by the combustion. In the preferred form, the mantle is fabricated from .018″ nickel-chromium alloy sheet and is perforated with 324 holes of .033″ diameter per square inch so that the total open area amounts to about 29%. In this instance the mantle attains incandescence during operation and maintains a temperature of about 1500° F.

Located above the mantle 27 is a divider assembly 30 which defines with the mantle 27 and mantle retainer assembly 26 an enclosed combustion chamber 31. Formed at the bottom of the divider assembly 30 is a V-shaped or wedge-shaped divider 32. The walls of the divider 32 are also formed of a high-temperature alloy which may be the same as that used for the mantle 27. The sloping walls direct the gaseous combustion products laterally outward through the perforations in the mantle 27 so that the heat energy carried by the gases is largely transferred to the mantle and assists in the heating of the mantle to incandescence.

It will be noted that the apex of the wedge-shaped divider 32 is spaced sufficiently above the flame layer so that there is no direct flame impingement thereon.

It will also be noted that the radiant mantle 27 and the adjacent wall of the V-shaped divider 32 present in a direction normal to mantle a solid incandescent front for radiating heat in the form of infra-red energy.

OPERATION

Under normal operating conditions the fuel gas to be burned in the combustion chamber 31 is directed from the orifice fitting 13 to the first venturi throat 15 where it is mixed with air and channeled through a mixer tube to a second orifice 16 where it is directed to a second venturi throat 17. At the second venturi throat 17 additional air is mixed in with the gaseous mixture to provide a resulting fuel-air mixture at approximately the combining ratio. The mixture entering the plenum is deflected upwardly by the floor of the burner housing in a uniform pattern through the burner screen 20. At this stage sufficient mixing of the fuel gas and air has been achieved to provide optimum combustion. After the gases pass through the burner screen 20 they are ignited and the resulting combustion provides a flame layer in the combustion chamber 31 spaced above the burner screen 20.

It will be noted that none of the flames impinge directly upon any metallic parts of the heater A so that the combustion is as complete as possible. The heat generated in the combustion chamber serves to heat the walls of the perforated radiant mantle 27 and also the V-shaped divider 32 so that the elements become incandescent and radiate infra-red energy to the surrounding space.

The hot gaseous combustion products are directed by the V-shaped divider 32 through the perforations in the radiant mantle 27 so that heat energy carried by the gases is partially transferred to the mantle. The escaped gases then mix with the air in the heated space, the concentrations of carbon monoxide and other undesirable gases being so small as to have no effect upon the comfort of persons occupying the enclosed heated space.

While the invention has been described with respect to a specific embodiment thereof, it will be understood that this is for the purpose of illustration rather than limitation and that other variations and modifications will occur to those skilled in the art upon a reading of the specification and drawings, all within the intended spirit and scope of the invention as defined in the appended claims.

I claim:

1. An infrared generator comprising a housing defining a plenum with an upwardly facing outlet, a mixer tube assembly for introducing a gaseous fuel-air mixture at substantially a combining ratio into said plenum, a burner screen located in horizontal relation over said plenum outlet and adapted to provide ports for the upward passage of said gaseous mixture, the port loading of said screen being sufficient to maintain a flame layer spaced above said screen, means defining a combustion chamber above said burner screen, and including a perforate mantle having opposed side walls spaced from said flame layer sufficiently to avoid any direct flame impingement, an imperforate wedge-shaped deflector projecting downwardly into said combustion chamber a major portion of the depth of said mantle and extending longitudinally between said side walls substantially the length thereof, said deflector being adapted to divert the gaseous products of combustion laterally outwardly through said perforations in said side walls and said deflector adapted to be heated to incandescence by the energy released during combustion of said gaseous mixture whereby each side wall and said deflector provide a solid incandescent front as viewed in a direction normal to said side wall.

2. An infrared generator as defined in claim 1 wherein said mixer tube assembly includes means defining a first orifice communicating with a fuel gas supply line, means defining a first venturi throat, said first orifice adapted to direct a fuel gas into said first venturi throat wherein air is drawn in and mixed with said fuel gas, means defining a second orifice communicating with said first venturi throat, means defining a second venturi throat communicating with said plenum and having its axis parallel to and spaced from the axis of said second orifice, said second orifice being adapted to direct a gaseous fuel-air mixture into said second venturi throat wherein additional air is drawn in, mixed with said gaseous mixture and supplied to said plenum.

3. An infrared generator as defined in claim 1 wherein said deflector is in the form of an elongated metallic member of V-shaped lateral cross-section, said member having its apex centrally located in said combustion chamber approximately midway between said vertical side walls of said mantle.

4. In an infrared generator including means defining a combustion chamber and means for burning a gaseous fuel-air mixture in said chamber, the improvement which comprises: a perforate mantle defining at least two opposite side walls of said combustion chamber, said side walls being adapted to be heated to incandescence by the combustion of said fuel-air mixture and being spaced from said flame layer sufficiently to avoid any direct flame impingement, and an imperforate wedge-shaped deflector projecting downwardly into said combustion chamber a major portion of the depth of said mantle and extending longitudinally between said side walls substantially the length thereof, said deflector adapted to be heated to incandescence by the combustion of said fuel-air mixture and to divert the gaseous products of combustion laterally outwardly through said perforations in said mantle, each of said opposite side walls and said deflector being adapted to project a solid incandescent front as viewed in a direction normal to said side wall.

References Cited

UNITED STATES PATENTS

| | | | |
|---|---|---|---|
| 669,302 | 3/1901 | Franklin | 158—118 X |
| 1,074,312 | 9/1913 | Collins | 126—85 |
| 1,346,935 | 7/1920 | Brigel | 158—118 |
| 1,700,918 | 2/1929 | Baker | 158—118 X |
| 2,386,978 | 10/1945 | Ruhl | 158—118 |
| 2,985,137 | 5/1961 | Horne | 126—92 X |
| 1,216,848 | 2/1917 | Schmidt | 126—86 |
| 1,817,420 | 8/1931 | Packer | 126—92 |

FREDERICK L. MATTESON, JR., *Primary Examiner.*

H. B. RAMEY, *Assistant Examiner.*